No. 867,383. PATENTED OCT. 1, 1907.
E. M. LANG, Jr.
SOLDER HEMMED CAP.
APPLICATION FILED APR. 19, 1906.

Witnesses:
A. C. Perry
A. G. McPherson

Inventor.
Edward M. Lang, Jr.
by Geo. E. Bird
Atty.

THE NORRIS PETERS CO., WASHINGTON, D. C.

UNITED STATES PATENT OFFICE.

EDWARD M. LANG, JR., OF PORTLAND, MAINE.

SOLDER-HEMMED CAP.

No. 867,383.　　　　Specification of Letters Patent.　　　　Patented Oct. 1, 1907.

Application filed April 19, 1906. Serial No. 312,629.

To all whom it may concern:

Be it known that I, EDWARD M. LANG, Jr., a citizen of the United States, residing at Portland, in the county of Cumberland and State of Maine, have invented an Improvement in Solder-Hemmed Caps; and I hereby declare that the following is a full, clear, and exact description of the invention, which will enable others skilled in the art to which it appertains to make and use the same.

My invention relates to caps or studs used for the closing of metal cans containing hermetically sealed goods and to that class of caps or studs which are hemmed with solder.

Figure 1:
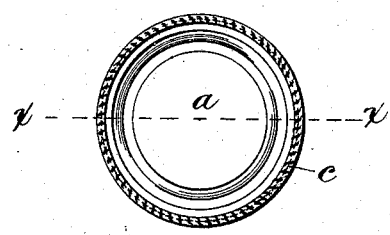
Figure 2:
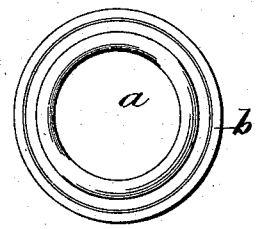
Figure 3:
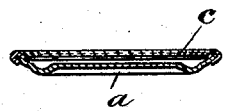
Figure 4:
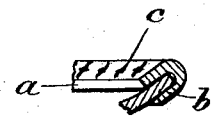

My improvement consists in knurling the under surface of the hem of solder upon the cap as is more particularly shown in the following description in which, Figure 1 is a plan of the under side of the cap; Fig. 2 is a top plan of the cap; Fig. 3 a vertical cross section on the line $x$ $x$ of Fig. 1, and Fig. 4 a detail of a portion of the cap as shown in Fig. 3.

As stated, my improvement consists in knurling the under side of the hem of solder which is placed upon the cap $a$ or providing such under side of the hem $b$ with indentations at frequent intervals, as shown substantially in Fig. 1. This may be accomplished by knurling or indenting entire under surface of the ribbon or ring of solder with which the cap is hemmed before it is placed upon the cap or, preferably, knurling or indenting the under side of the inner part of the ribbon of solder which will be hemmed underneath the cap. I prefer, however, to knurl or indent the lower die by which, in the process of hemming the cap, the under side $c$ of the ribbon or strip or hem $b$ of solder, which is to be hemmed upon the cap, is fixed to the cap, making the die which turns down the hem upon the upper surface of the cap plain or unknurled, because this method confines the knurling strictly to that portion $c$ of the hem $b$ which is beneath the cap.

The advantages of the improved cap constructed as above set forth are found in the fact that during the initial stages of the soldering process the knurling or roughening of the lower surface of the hem keeps the cap in place upon the stud of the can and also in the fact that the indentations or grooves which are formed by the knurling process permit the gases formed by the heat in the initial stages of the soldering process to escape.

What I claim as my invention is:

1. A cap having a continuous hem of solder, the under side of said hem being roughened or knurled at repeated intervals, substantially as described.

2. As a new article of manufacture, a cap, the edge of which is provided with a continuous hem of solder, said hem being knurled or roughened upon the under side thereof at frequent intervals, substantially as described.

In testimony whereof, that I claim the foregoing as my invention I have hereunto set my hand this seventeenth day of April, A. D. 1906.

EDWARD M. LANG, JR.

Signed in presence of—
　　GEO. E. BIRD,
　　A. C. BERRY.